(12) United States Patent
Kuznetsov et al.

(10) Patent No.: US 9,823,377 B1
(45) Date of Patent: Nov. 21, 2017

(54) MULTI-THREAT DETECTION OF MOVING TARGETS

(71) Applicants: Andrey Kuznetsov, St. Petersburg (RU); Valery Averyanov, St. Petersburg (RU); Igor Gorshkov, St. Petersburg (RU)

(72) Inventors: Andrey Kuznetsov, St. Petersburg (RU); Valery Averyanov, St. Petersburg (RU); Igor Gorshkov, St. Petersburg (RU)

(73) Assignee: APSTEC SYSTEMS USA LLC, Owings Mills, MD (US)

( * ) Notice: Subject to any disclaimer, the term of this patent is extended or adjusted under 35 U.S.C. 154(b) by 0 days.

(21) Appl. No.: 15/596,345

(22) Filed: May 16, 2017

Related U.S. Application Data

(63) Continuation-in-part of application No. 14/964,328, filed on Dec. 9, 2015, now Pat. No. 9,697,710, and a continuation-in-part of application No. 14/319,222, filed on Jun. 30, 2014, which is a continuation-in-part of application No. 14/259,603, filed on Apr. 23, 2014, (Continued)

(51) Int. Cl.
| | |
|---|---|
| *G08B 13/196* | (2006.01) |
| *G01V 3/12* | (2006.01) |
| *G08B 21/02* | (2006.01) |
| *H04N 7/18* | (2006.01) |
| *H04N 13/02* | (2006.01) |
| *G01V 8/00* | (2006.01) |
| *G01V 8/10* | (2006.01) |

(52) U.S. Cl.
CPC .............. *G01V 3/12* (2013.01); *G01V 8/005* (2013.01); *G01V 8/10* (2013.01); *G08B 21/02* (2013.01); *H04N 7/181* (2013.01); *H04N 13/0282* (2013.01)

(58) Field of Classification Search
None
See application file for complete search history.

(56) References Cited

U.S. PATENT DOCUMENTS

2005/0248450 A1* 11/2005 Zanovitch .............. G08B 25/14
340/506
2007/0146720 A1* 6/2007 Cox ....................... G01J 3/2823
356/451

(Continued)

*Primary Examiner* — Eileen Adams
(74) *Attorney, Agent, or Firm* — Nadya Reingand; Yan Hankin

(57) ABSTRACT

The present invention comprises a multi-modal security checkpoint. The security checkpoint can simultaneously scan for and simultaneously identify hidden metallics (e.g., weapons, shrapnel) and non-metallics (e.g., explosives, dielectrics). The security checkpoint performs scanning and identifying at a rate of 15 or more frames per second for all targets within the inspection area. The security checkpoint comprises blocks for sending and receiving radiation signals, the blocks comprising transmitters and/or receivers, the blocks being configured to share information to compare cross- and co-polarizations of signals emitted. The security checkpoint combines many threat detection technologies into one checkpoint that allows it to be robust and detect a large variety of threats in mass transit hubs requiring high throughput processing capabilities.

19 Claims, 11 Drawing Sheets

Related U.S. Application Data now Pat. No. 9,330,549, and a continuation-in-part of application No. 14/160,895, filed on Jan. 22, 2014, now Pat. No. 9,282,258, and a continuation-in-part of application No. 13/528,412, filed on Jun. 20, 2012, now Pat. No. 9,304,190.

(60) Provisional application No. 62/211,707, filed on Aug. 29, 2015, provisional application No. 61/945,921, filed on Feb. 28, 2014, provisional application No. 61/905,940, filed on Nov. 19, 2013.

(56) References Cited

U.S. PATENT DOCUMENTS

| | | | |
|---|---|---|---|
| 2011/0058645 A1* | 3/2011 | Heuscher | A61B 6/032 378/16 |
| 2011/0167936 A1* | 7/2011 | Sagi-Dolev | G01V 5/0008 73/865.8 |
| 2012/0172954 A1* | 7/2012 | Zastrow | A61N 5/025 607/101 |

* cited by examiner

MULTI-THREAT DETECTION OF MOVING TARGETS

CROSS-REFERENCE TO RELATED APPLICATIONS

The present patent application is a Continuation-In-Part of U.S. patent application Ser. No. 14/964,328, filed Dec. 9, 2015, which claims priority to U.S. Provisional Patent Application Ser. No. 62/211,707, filed Aug. 29, 2015, and which is a Continuation-In-Part of U.S. patent application Ser. No. 14/319,222, filed Jun. 30, 2014, which is a Continuation-In-Part of U.S. patent application Ser. No. 14/259,603, filed Apr. 23, 2014, now U.S. Pat. No. 9,330,549, which claims priority to U.S. Provisional Patent Application Ser. No. 61/945,921, filed Feb. 28, 2014, and which is a Continuation-In-Part of U.S. patent application Ser. No. 14/160,895, filed Jan. 22, 2014, now U.S. Pat. No. 9,282,258, which claims priority to U.S. Provisional Patent Application Ser. No. 61/905,940, filed Nov. 19, 2013, and which is a Continuation-In-Part of U.S. patent application Ser. No. 13/528,412, filed Jun. 20, 2012, now U.S. Pat. No. 9,304,190. The teachings and disclosure of U.S. Pat. No. 9,282,258, are included via reference herein in their entireties. All said applications and their disclosures are incorporated herein by reference in their entireties.

FIELD OF THE INVENTION

This invention is in the field of multiple threat detection systems. Particularly this invention is in the field of detecting concealed or hidden improvised explosive devices (IEDs), metallic weapons and/or shrapnel, and radioactive and nuclear materials.

BACKGROUND ART

The closest threat detection system to present invention is the Rapiscan Systems Secure 1000 SP. The Secure 1000 SP uses backscatter technology as well as image processing software and an operator interface to screen passengers for a wide range of potential threats including liquids, contraband, ceramics, explosives, narcotics, concealed currency and weapons. The Secure 1000 SP generates a front and back scan simultaneously. The Secure 1000 SP can detect small objects and threats concealed on a passenger. It can detect organic and inorganic threats, metals and non-metallic objects and can detect concealed liquids, ceramics, weapons, plastic explosives, narcotics, metals, contraband, currency etc. The Secure 1000 SP requires one pose with no additional movement by the passenger, a full scan can be completed in seconds. The Secure 1000 bounces very low dose of x-rays off of a person to generate an image. This image is then analyzed by an operator to identify concealed potential threats.

The Rapiscan Systems Secure 1000 is limited in that it requires a person to be in a single pose for scanning, it requires an operator to determine what threats are present and to review the scanned images, it uses x-rays for scanning, it only performs backscatter and no pass through imaging, at it is designed to work at a security checkpoint as opposed to use in an array where it can scan multiple individuals and their luggage without causing a security bottleneck. The Rapiscan Systems Secure 1000 is incapable of detecting radiation/nuclear materials.

There is a need for multi-threat detection systems with very short processing time allowing detection of a variety of threats simultaneously.

SUMMARY OF THE INVENTION

The present invention uses microwave detection to find non-metallic objects that are hidden, it uses cross-polarized microwaves to detect hidden metallic weapons or shrapnel, and uses gamma ray detection to find radioactive materials. Each of these technologies provide threat detection, combined these technologies can provide detection of even more types of threats.

The present invention using microwave detection used in conjunction with cross-polarized microwave detection detects IEDs with shrapnel. When using microwave detection, reflective or pass through, dirty bombs are detectable. And the combination of cross polarized microwave detection with gamma detection allows for detection of radioactive/nuclear material that is shielded by metal.

The present invention allows for real time scanning of individuals, multiple individuals at once, for reflected microwave, cross polarized microwave, and radioactive/nuclear scanning either in a security checkpoint or in an open array/portal that people walk through. The devices in an array/portal can be disguised as advertisement space, information boards, etc. The present invention can be used in conjunction with facial recognition software to track a suspicious individual through a given space. The present invention can be use with a limited access entry portal that can isolate an individual to perform subsequent scans in order to determine, automatically, if a threat is detected or if there is a false alarm all while minimally disrupting throughput of the entry portal. The present invention can also be integrated into a system of multiple scan points and use subject tracking in order to perform additional scans and automatically determine threat presence. Furthermore, the invention can be practiced in an automatic manner or be reviewed by operators. The invention can also be used to perform pass through and radiation/nuclear scans of rolling luggage, handbags, briefcases, backpacks, etc. The present invention also performs automatic facial recognition from a distance, against a database of known or suspected terrorists and provide an alert. The present invention provides different alerts based upon the types of materials found.

An appreciation of other aims and objectives of the present invention and a more complete and comprehensive understanding of this invention may be achieved by referring to the drawings, and by studying the description of preferred and alternative embodiments.

BRIEF DESCRIPTION OF THE DRAWINGS

The present invention will now be discussed in further detail below with reference to the accompanying figures in which:

FIG. 3 (b) shows an example of the location of explosives on the human body under the coat or other garment. FIGS. 3(c) and 3(d) show the optical paths and distances measured or calculated by the claimed invention in the case of hidden objects.

In FIG. 13, each bold line represents different levels of processing as related to the fast switching. The total time estimated for each specific switching is exemplified in the figure; for example, the lowest bold line represents a process of switching between individual transmitting antennas in an array of transmitters and the time required, according to the present invention, for information (statistic/data) collection by an individual transmitter (occurring in the order of $10^{-7}$ seconds). Summing all transmitter (Tx) switching, and combining all frequencies into one frame, the result in this particular example is at least 15 frames per second.

FIG. 14A shows a graph of cross-polarized vs. co-polarized amplitudes for (1, square points) a body without objects, (2, circular points) metals on a body (shrapnel and a gun), and (3, triangular points)) a dielectric on a body (wax). FIG. 14B shows a graph representing discrimination between a body without objects 41, a body with metals 42, and a body with dielectrics 43, obtained by employing an SVN algorithm with Principal Component Analysis (PCA) data pre-processing. FIG. 14A represents experimental data collected in Cross- and Co-polarized amplitudes. FIG. 14B represents the same data as in FIG. 14A but after pre-processing in the PCA algorithm, and in coordinates of the two main principal components 1 and 2. The PCA processing removes the influence of measurement units in raw data and can also removes noise components from raw data (e.g., when more than 2 "row" parameters are used). FIG. 14B represents, in particular regions, how to differentiate data for three different cases (even if some of points are very close to one another): body without objects 41, a body with metals 42, and a body with dielectrics 43. The Principal Component Analysis (PCA) algorithm used for pre-processing, as exemplified in FIG. 14B allows for differentiation of, e.g., row data which partly overlap, as exemplified in FIG. 14A. After the PCA processing, an appropriate classification algorithm can be used, such as, e.g., support vector machines or one of the following: Bayes classifier, neural networks, gradient boosted trees, K-nearest values, etc.

DETAILED DESCRIPTION OF THE PREFERRED EMBODIMENTS

As radio waves travel through the air, they travel in a way similar to waves of water moving across the surface of the ocean. The shape of a simple radio signal can be depicted as a repeated up and down movement or vibration. This up and down motion of the wave takes place in three dimensions. A wave which is polarized parallel to the plane of propagation is called a horizontally polarized wave. A wave which is polarized perpendicular to the plane of propagation is called a vertically polarized wave. The height or intensity of the wave is called the amplitude of the wave. The idea of polarization is applicable to all forms of transverse electromagnetic waves, whether they are radio waves at microwave frequencies, or light waves such as those emitted by a flashlight.

The power levels radiated by the present invention are much lower than conventional radar systems or than those generated by x-ray or other imaging systems that are currently employed to detect objects at the entry of an airport or a courtroom. In general, some of the preferred embodiments of the invention operate in the MHz or GHz frequency bands. Different radio or microwave frequencies offer different benefits and disadvantages for the object detection provided by the present invention. Although the description of some embodiments of the invention include specific references to particular frequency ranges, the system may be beneficially implemented using a wide variety of electromagnetic radiation bands.

Figure 1:
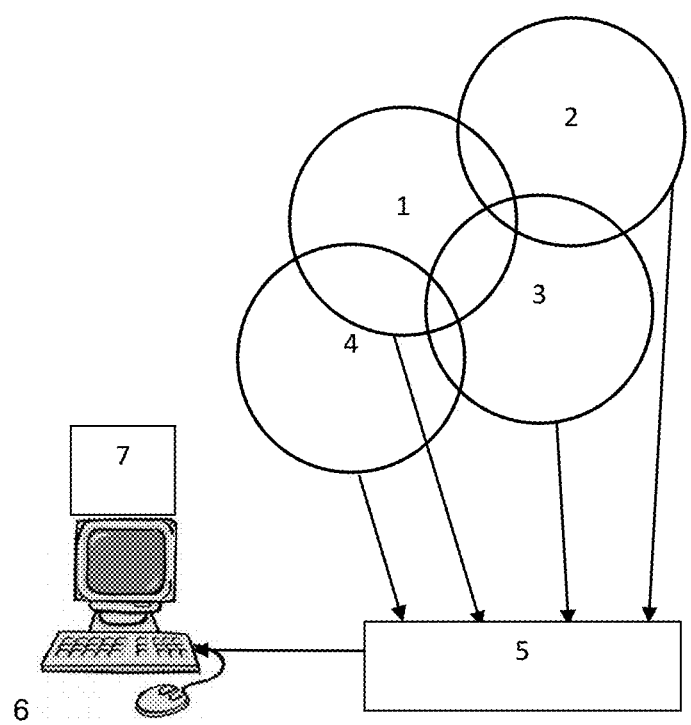
FIG. 1 provides a schematic block diagram of multi-threat detection system.

FIG. 1 presents a schematic block diagram of the system: a block 1 detecting a first threat, which is explosives or improvised explosive device (IED); a block 2 detecting a second threat which is metal weapon; and block 3 detecting a third threat 3 which is radioactive and nuclear material. Those blocks share certain sensors or other elements to obtain data related to all threats thus creating an interleaved united system. All data from all three blocks enters a processing unit 5, where it is processed simultaneously. The results of the processing are visualized in computer 6. The computer 6 is connected to alarm system 7 to provide audio and/or visual alarm in the case of potential threat. The alarm has an ability to indicate what type of threat is detected.

To facilitate the detection, in one embodiment, the system also includes a face recognition unit 4 (FIG. 1), which compares a checked person face with images of faces from a database of known members of terrorist organizations.

Below we disclose various embodiments of the blocks 1-4 below and the ways they are interconnected. In the following description, for purposes of explanation, specific examples are set forth to provide a thorough understanding of the present invention. However, it will be apparent to one skilled in the art that these specific details are not required in order to practice the present invention. The same techniques can easily be applied to other types similar systems.

Block 1

Block 1 makes it possible to remotely determine the dielectric permittivity of a moving, irregularly-shaped dielectric object. The dielectric permittivity of a dielectric object is determined when the object is placed against the background of a reflector. The method includes recording a 3D microwave and a 3D optical range images of an interrogated scene at the same time moment, digitizing all images and overlapping them in one common coordinate system; determining a space between the microwave and optical image (as described below), calculating a dielectric permittivity c of the space; and concluding the absence of hidden dielectric object where the dielectric permittivity is less than a threshold value. If the dielectric permittivity is in the fixed range (for example 2.9-3.1), then the conclusion is made on the presence of a hidden object.

Figure 2:
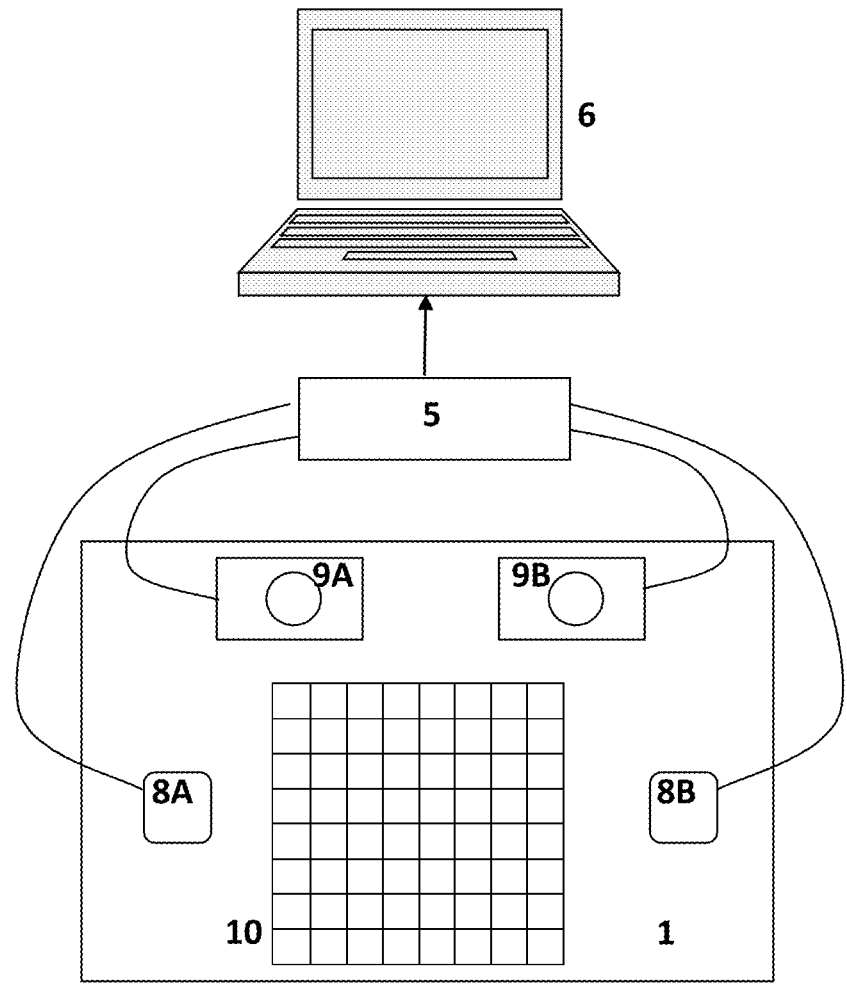
FIG. 2 shows a detailed schematic of threat detection block 1, the active microwave detection system.

FIG. 2 shows the schematics of the first block 1 for Active Microwave Detection (AMD). The interrogated space is digitally scanned with microwave radiation using two or more elemental microwave emitters 10. The signal reflected from the monitored area is picked up by one or more parallel microwave detectors 8A and 8B. The received signal undergoes coherent processing in digital signal processing unit (DSP) 5 to obtain maximum intensity values of the restored configuration of scattering objects in the monitored area, depending on the distance from the elemental emitters to the target. The information obtained after processing is then displayed on the computer 6 by constructing a microwave image corresponding to a three-dimensional surface. A video image of the target is also obtained using two or more video cameras 9A and 9B which are synchronized with the microwave emitters 10 via the processing unit 5. The obtained video images are transmitted into the processing unit and are further converted to its digital form, and a three-dimensional image of the target is constructed and displayed on the display 6.

The AMD operates by sending microwaves (in centimeters range) towards a moving target (e.g., a person), and detecting the reflected waves afterwards. The data analysis is carried out in real time by high-speed GPUs to obtain the image of a potentially hidden object and receive information about its volume and dielectric properties, which allows distinguishing between a common object and a potential explosive. This information is then used to automatically assign a threat level to the found 'anomaly' without an operator's involvement.

A system for unveiling a dielectric object in an interrogated space is disclosed, wherein the interrogated space is located between an inner layer and an outer layer, comprising at least two microwave (MW) sources and at least one MW receiver forming 3D MW images of the interrogated space, wherein said 3D microwave images are formed by emitting MW signals from the MW sources towards the interrogated space, wherein each MW signal partially reflects off the outer layer (first boundary in FIG. 3) and the remainder of the MW signals travels through the intermediary space, where the reminder of the MW signals partially reflects off the inner layer (second boundary in FIG. 3), where said MW receiver receives reflected signals from said outer and inner layer, further comprising a computer/calculator which is adapted for determining at least two distances P1 and P2, between at least two sets of points, where P1=(A2−A1) and P2=(B2−B1); wherein A1 is a point of a first MW beam reflected from the outer layer, and A2 is a point of the same first MW beam reflected from the inner layer, wherein B1 is the point of a second MW beam reflected from the outer layer, and B2 is a point of the same second MW beam reflected from the inner layer (FIG. 4 $a$ and $c$), wherein the at least two sets of two points are spaced from each other by a predetermined value S; and which is further adapted for calculating the difference D between P1 and P2 and comparing the difference D with a predetermined threshold value T; and further comprising an alarm adapted for indicating a likelihood of a hidden dielectric object between the inner and the outer layer, if the difference between P1 and P2 is greater than a threshold value T.

Also, a method for unveiling hidden objects in an intermediary space is disclosed, wherein the intermediary space is located between an inner layer and an outer layer, comprising sending microwave (MW) signals from MW sources towards the interrogated space, the signals being partially reflected on the outer layer and partially on the inner layer, receiving at a MW receiver a first and a second response of MW signals reflected back from the outer and the inner layer; the first and the second response signals corresponding to a first and a second 3D MW image, wherein the first 3D MW image corresponds to the outer layer of the interrogated space, and the second 3D MW image corresponds to the inner layer of the interrogated space, determining at least two distances, P1 and P2, where P1=(A2−A1) and P2=(B2−B1); where A1 is a point of a first MW beam reflecting from the outer layer and A2 is a point of the same first MW beam reflecting from the inner layer, where B1 is the point of a second MW beam reflecting from the outer layer and B2 is a point of the same second MW beam reflecting from the inner layer; wherein A1 and B1 are spaced from each other by a predetermined value S; calculating the difference D between P1 and P2, comparing the difference D with a predetermined threshold value T; indicating if the difference D is greater than the threshold value T. In one embodiment, the method further comprises determining at least a third and a fourth distance P3 and P4 from a third and a fourth response signal, where P3=(C2−C1) and P4=(D2−D1), where C1 is the point of a third MW beam reflecting from the outer layer and C2 is a point of the same third beam reflecting from the inner layer, where D1 is a point of the fourth MW beam reflecting from the outer layer, and D2 is a point of the same fourth MW beam reflecting from the inner layer. P3 and P4 can be used to increase reliability of an alarm triggered when the difference D between P1 and P2 is greater than the threshold value T. P3 and P4 can be determined in essentially the same area where P1 and P2 are determined, but using different viewing angels. P3 and P4 can also be used to detect further hidden objects in a different area than where P1 and P2 are determined.

The interrogated space can be between the body of a person and the clothing of this person or between two layers of clothing of a person. The outer layer is preferably formed by the boundary between air and the outer clothing of a person.

Figure 3:
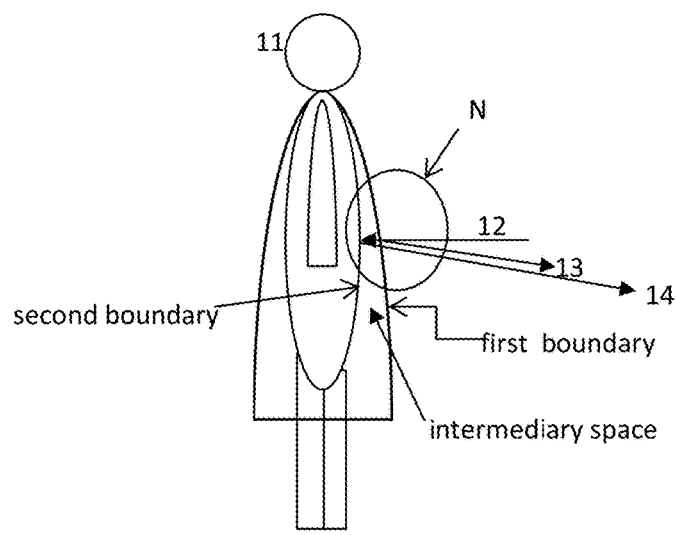
FIG. 3 shows the microwave path and reflection off a target's coat and body boundaries (first and second boundaries, respectively).
Figure 4:
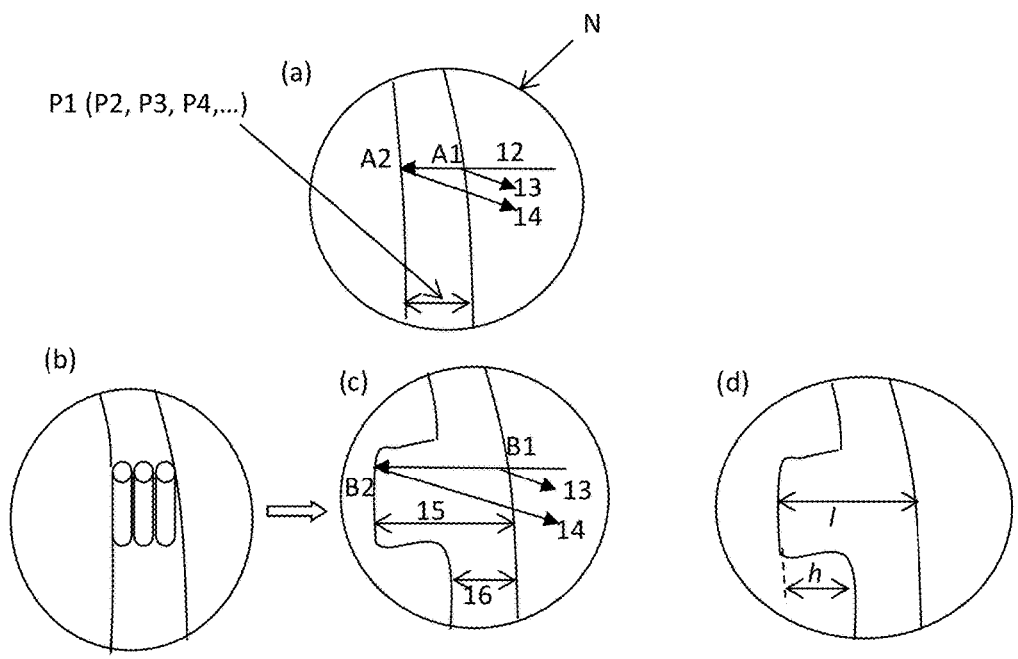
FIG. 4 further details a microwave (MW) beam's reflection in (a) the absence, and (b), (c), (d) the presence of hidden dangerous objects.

3D Microwave Imaging. Determining the presence of a potentially hazardous object carried by a target 11 is done in the following manner (FIG. 3). Some of the primary emitted MW radiation 12 is partially reflected by the first (outer) boundary (usually the person's coat/jacket/outer garment) forming a reflected beam 13 (see FIG. 4($a$)—an enlarged view of area N—for greater detail). The same radiation/wave then travels through the coat until reflected by the second (inner) boundary, the human body, forming a second reflected beam 14. Thus, at least two reflections of the same wave occur—one reflection occurs at the outer boundary of the target and/or object (i.e. the first border, or air/intermediary space border) and another reflection occurs after the wave travels through the intermediary space and reflects off the target's body (i.e. the opposite side of the hidden dielectric object, if present). The measured distance P1 of the intermediary space between the first and second boundaries is recorded and used to detect the presence of hidden objects, P1=(A2−A1) is the distance between the point A2 on the second boundary and corresponding point A1 on the first boundary. This process is repeated for measuring of at least one other distance or continuously for measuring of other distances, allowing microwave beams to hit and reflect off of various locations along the first and second boundaries. Each additional microwave beam that reflects off additional locations along the first and second boundaries B1, C1, D1, . . . and B2, C2, D2, . . . allows for measurement of additional distances P2, P3, P4, . . . between first and second boundaries. With microwave signals being emitted and received continuously, 3D microwave images of the inspected area are created. The first 3D MW image corresponds to the first boundary, and the second 3D MW image corresponds to the second boundary. The method allows determining the presence of hidden dielectric objects on the human body under the outer garment or carried by the person. Area N is enlarged and shown in greater detail in FIG. 4(a). FIG. 4(a) represents a situation without a hidden object. FIG. 4(b) illustrates how an explosive might be worn on the body under a coat. In a preferred embodiment of the present invention, the hidden objects are explosive materials of components thereof. In one embodiment, the method of the present invention is used to unveil hidden suicide bombs in a crowd of moving people. The dielectric constant of explosives is about three or larger. The MW radiation traveling through a medium with such a high dielectric constant is equivalent to traveling a longer distance in air and thus the microwave image of a hidden object is portrayed as a cavity protruding into the body, as illustrated by FIG. 4(c). This seemingly longer distance corresponds to a sharp change of the microwave beam path length, which is detected by the receivers because the MW beam in a first area 15 contains extra path gain compared to the MW beam in a second area 16. By measuring the phase and amplitude of incoming reflected microwaves, the microwave path (i.e. the path of the microwave beam/signal) can be determined and the sudden sharp change of the path in certain areas, if present, is registered. Because a microwave travels more slowly in an object with a higher dielectric (permittivity) constant, a second border signal takes longer to arrive in the presence or area of an object (compared to areas where no object is present, e.g., just above, below, or to either side of an object.). If the change in path value exceeds a preset threshold value, it serves as an indication that a hidden object is present.

In the preferred embodiment, the threshold value T is system resolution in depth in the direction perpendicular to the first and the second boundaries (i.e. the outer and inner layers, also called borders). In the preferred embodiment, the resolution is equal to 1 cm. The resolution depends on the bandwidth of the MW frequencies used. The resolution is equal to the speed of light in vacuum divided by the doubled bandwidth of the MW frequencies used. Bandwidth of the MW frequencies is typical 15 GHz, which thus means 1 cm resolution in depth.

The additional path, h (see FIG. 4(d)), is equal to h=l $((\mathcal{E}^{1/2}-1)/(\mathcal{E}^{1/2}))$, where l is the thickness of the intermediary space, which equals the distance from the first boundary to the second boundary including the cavity, if present, as shown by the first area 15 (see FIG. 4(c)), and is the dielectric (permittivity) constant of the intermediate space. The additional path, h, is calculated by subtracting the measured value of the second area 16 from the measured value of the first area 15.

The first and the second border signals can be used to reconstruct two 3D MW images of a person, one corresponding to the outer garment and the other corresponding to the human body, as described above. However, the signal received from the first border of an interrogated space, due to its small value, may be disrupted by the side lobes (i.e. secondary maximums) of the signal from the second border. Preferably, a synchronized video image border can additionally be used, if the signal/noise ratio is low (see FIG. 2).

MW radiation can be emitted from various different angles and the reflected radiation, also travelling from various different angles, is similarly processed, allowing for accumulation of additional data to improve the accuracy and resolution of the image and detection process. Various configurations of setups are possible.

Simultaneous 3D Video and MW Imaging. Additionally, a 3D video image of the target can be recorded at the same time of a MW image. In this preferred embodiment, the method of the invention thus further comprises forming a 3D optical image of the outer layer of the interrogated space, synchronizing the 3D optical image with the location of the points A1, B1 and optionally C1 and D1, determining points A1', B1' and optionally C1' and D1' on the 3D optical image corresponding to the points A1, B1 and optionally C1 and D1, calculating the differences P1'=(A2−A1'), P2'=(B2−B1') and optionally P3'=(C2−C1') and P4'=(D2−D1') and comparing the values P1 with P1', P2 with P2' and optionally P3 with P3' and P4 with P4'. Similarly, in the invention a system as described before is preferred which further comprises at least two cameras recording optical images of the interrogated space and being adapted for forming a 3D optical image of the interrogated space; and a computer which is adapted for synchronizing in time and superimposition and digital space of the 3D optical image with the 3D MW image formed by the at least two microwave sources and at least one microwave receiver of the interrogated space, which is reflected from the outer layer. The reflection signal from the outer layer (points A1 and B1) may be few times weaker compared to the reflected signal from the inner layer (points A2 and B2). Points (A1', B1') from the outer layer extracted from a 3D optical image of the outer layer of the interrogated space (delivered by stereo cameras) can be used to calculate P1' and P2' and compare with P1 and P2.

Preferably, more than 100 microwave sources are used in the method of the present invention. It is also preferable to use microwave sources which have a spectrum comprising multiple frequencies.

Preferably, at least two video cameras 9A and 9B (see FIG. 2) record images of the target, and the DSP unit 5 reconstructs a 3D video image of the object. Optical beams do not penetrate the outer boundary (i.e., the person's outer garment in the example herein). This 3D video imaging is synchronized in time with the 3D microwave imaging. Overlapping the 3D video image over the 3D MW image of the outer border can achieve improved accuracy of the position of the outer border and improved calculation of the additional path, h. In one embodiment, the system is additionally equipped with an automatic alarm, which triggers a sound or a visual alert if the distance h is above a predetermined threshold value and thus the presence of a hidden object(s) is suspected.

In one embodiment the 3D microwave image is formed by illumination of the scene by microwave radiation from one emitter and recording the scene image by at least two microwave detectors. In another embodiment the illumination is performed by at least two separate microwave emitters that illuminate the scene from different angles, and the recording is performed by one microwave detector.

In one embodiment the microwave emitter radiation is a coherent microwave radiation at N frequencies, which optionally can be equi-frequencies, are not related to the lines of absorption of the irradiated media.

The 3D optical image is formed by illumination of the scene by optical radiation and recording the scene image by at least two optical detectors. Different types of processing may apply. In the preferred embodiment, a digital signal processor (DSP) performs a coherent processing, which calculates the 3D image taking into account both amplitude and phase information of electromagnetic fields reflected from the interrogated scene.

Block 2

The purpose of Block 2 is to detect hidden metal weapon and metallic shrapnel. When the present invention is used to detect an object like a handgun, the detection is more easily accomplished when the handgun is oriented in a way that presents a relatively larger radar cross section to the detector. For example, a gun that is tucked behind a person's belt buckle so that the side of the gun is flat against the waist presents a larger radar cross section than a weapon holstered on the hip with the gun barrel pointing toward the ground and the grip pointing forward or back. In general, the present invention relies on the physical phenomenon of reflection in which an incident beam of horizontal polarization will be partially reflected back as vertical polarization. The percentage of energy converted to vertical polarization depends on the shape of the weapon in the plane normal to the direction of incidence and sharpness (contrary to flat parts) of different parts of weapon (or shrapnel). If the weapon has a cross sectional shape that has both vertical and horizontal components, then a vertically polarized component will be realized even though the object is irradiated by horizontal polarization.

Measuring the phase of the polarized waves reflected from a person who may be carrying a concealed weapon is important because the polarized waves reflected from a concealed weapon and the polarized waves reflected from a human body behave quite differently. In general, the reflections from a concealed weapon, while not constant, vary within a relatively confined range. In contrast, the reflections from a human body are chaotic. A preferred embodiment of the invention exploits this generalized phenomena by using signal processing methods to distinguish the relatively well-behaved signals from a concealed weapon from the generally unpredictable signals from a human body.

Figure 5:
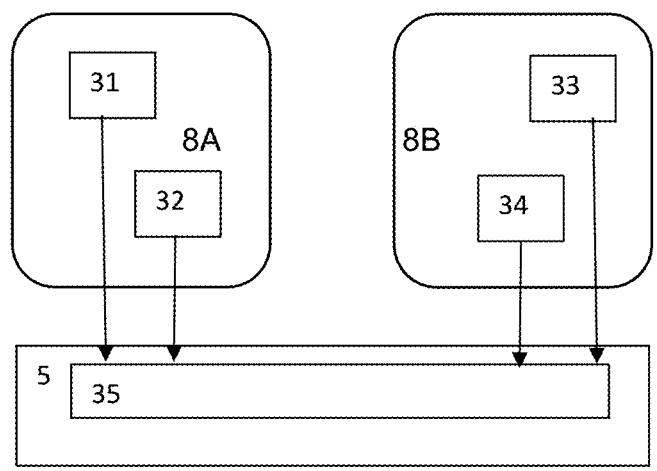
FIG. 5 detectors in the cross-polarization method of the present invention.
Figure 6:
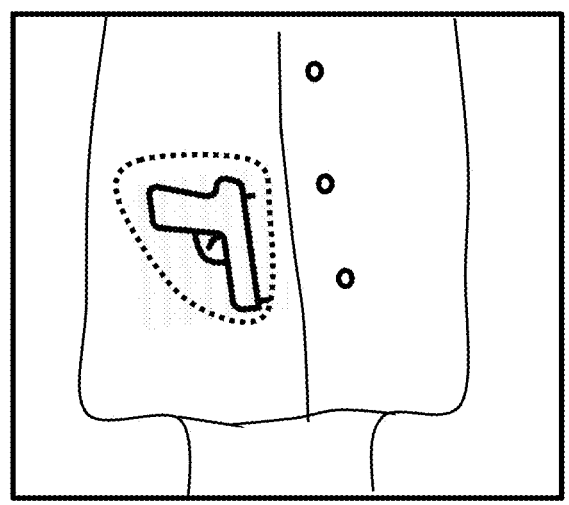
FIG. 6 is a schematic image of hidden metal threat obtained via the cross-polarization method of the present invention.

The present invention incorporates the apparatus depicted in FIG. 2 to measure amplitude and phase of the returned cross-pole signal. Microwave receivers 8A and 8B include two detectors each as shown in FIG. 5. Detectors 31 and 32 register received microwave radiation with vertical polarization and detectors 32 and 34—with horizontal polarization. In one embodiment this is achieved by placing corresponding polarization filters in front of the receivers. Data from the detectors 31-34 enters processing component 35, which is a part of the processing unit 5.

The present invention reconstructs a 3D MW image and compares amplitudes of reflected co- and cross-polarization waves in many places/zones of the human body simultaneously and in real time. This allows for detection of concealed weapons, shrapnel, or other items without comparison to pre-stored reference data. In an alternative embodiment of the invention the present invention takes reading of multiple individuals and automatically determines the presence of hidden weapons, shrapnel, or other items simultaneously.

The cross-polarization method partially uses the same equipment (microwave detectors, processing unit, computer, alarm system) as previously described 3D microwave imaging (Block 1) for detection of hidden plastic explosives.

Block 3

Block 3 uses gamma ray detection to find radioactive materials. In the preferred embodiment a spectroscopic device for detecting radioactive and nuclear material is used, which provides an energy spectra of gamma-ray sources detected, thus allowing to eliminate naturally occurring radioactive materials (NORM) and reduce false alarm.

Figure 7:
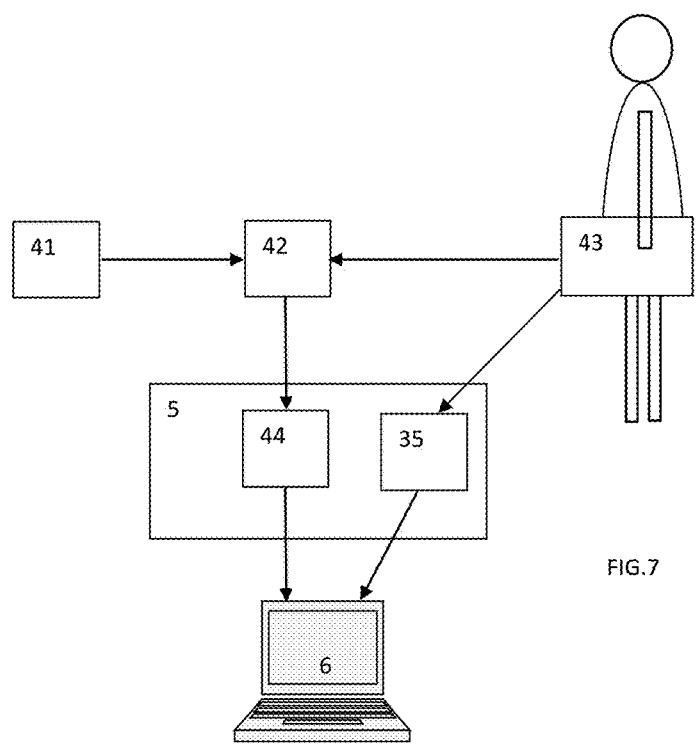
FIG. 7 is a schematic block diagram of the nuclear material detection block 3.

FIG. 7 shows a schematic of hidden radioactive (and nuclear) material detection system according to the present invention. A gamma ray detector 42 fed by a high voltage power supply 41 receives radiation from a source of radioactive radiation hidden in a personal luggage 43. The data from the detectors 42 enters multichannel analyzer 44, which is a part of the processing unit 5.

Figure 8:
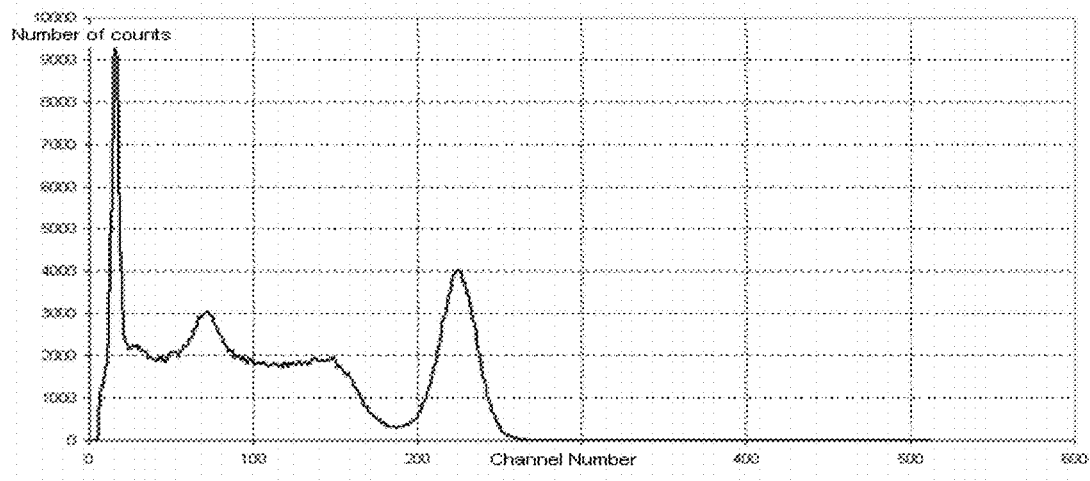
FIG. 8 shows a spectrum of cesium-137 obtained by sodium iodide (NaI) detector (prior art).

In the preferred embodiment scintillation detector is used as gamma ray detector 42. Scintillation detectors use crystals that emit light when gamma rays interact with the atoms in the crystals. The intensity of the light produced is proportional to the energy deposited in the crystal by the gamma ray. The detectors are joined to photomultipliers that convert the light into electrons and then amplify the electrical signal provided by those electrons. Common scintillators include thallium-doped sodium iodide (NaI(T1))—often simplified to sodium iodide (NaI) detectors—and bismuth germanate oxide (BGO). Because photomultipliers are also sensitive to ambient light, scintillators are encased in light-tight coverings. FIG. 8 shows a spectrum of cesium-137 obtained by sodium iodide (NaI) detector (prior art). The figure shows the number of counts (within the measuring period) versus channel number (related to energy of gamma rays).

Radioactive materials are stored inside sealed metal capsules (preferably heavy metal, like lead). Cross-polarization method (Block 2) is designed for detection of metal objects. The processing unit combines data from the multichannel analyzer 44 and the processing component 35 (FIG. 7) to increase the reliability of the radioactive (and nuclear material) detection.

Block 4

Block 4 provides face recognition based on comparing the face image obtained by cameras 9A and 9B (also used in Block 1) with a database of known suspicious people. Any know technique can be used for the data processing. For example, U.S. Pat. No. 6,301,370 discloses an image processing technique based on model graphs and bunch graphs that efficiently represent image features as jets. The jets are composed of wavelet transforms and are processed at nodes or landmark locations on an image corresponding to readily identifiable features.

Parallel Data Processing Occurring on One or More Computer Processors. The combinatorial processing of data collected by Blocks 1, 2, 3 and/or 4 is unique and advantageous. Such parallel and combined processing provides simultaneous collection and analysis of various data from combined threat detection techniques in real time for check points in public places such as airports, subway, etc. By processing such data in parallel, rather that separately, the processing time is greatly reduced, allowing for higher traffic flow without losing efficiency or quality of the threat detection, and in some embodiments, further improving the same while also allowing for higher traffic flow through the system.

Wide Angle of Inspection. The present invention is capable of achieving a wide angle of inspection, i.e. greater than 90 degrees perspective of an inspected area. This wide angle is achieved by an antenna design (emitters, Tx, and receivers, Rx) having a wide directionality range (more than 90 degrees). Tx and Rx antennas are designed as directional antennas with a wide antenna pattern with a main lobe more than 90 degrees at 3 dB beamwidth. See FIGS. 9-11.

Figure 9:
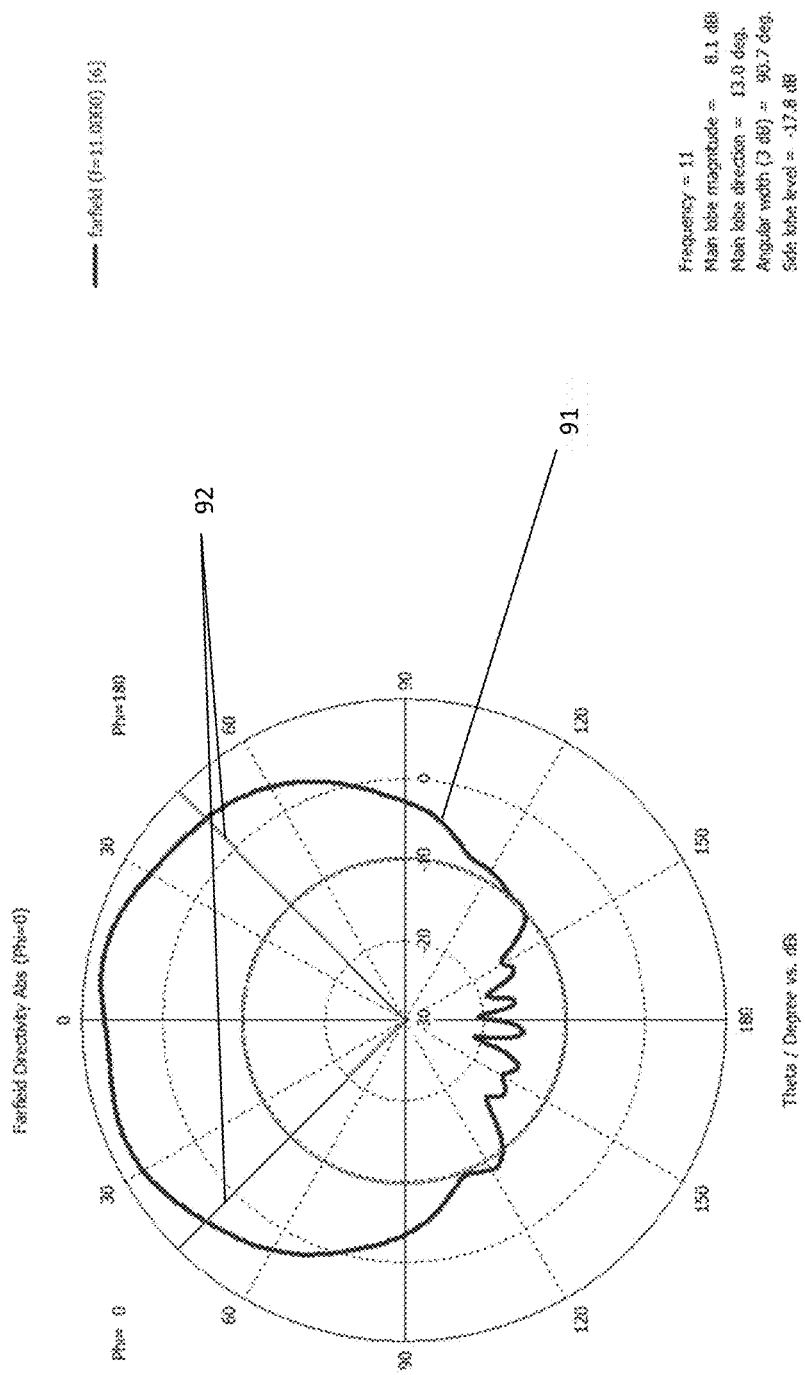
FIG. 9 shows a graphical example of transmitters with a wide-angle radiation pattern 91 in polar coordinates, at a frequency of 11 GHz. The main lobe is 90.7 degrees at 3 dB beamwidth 92.
Figure 10:
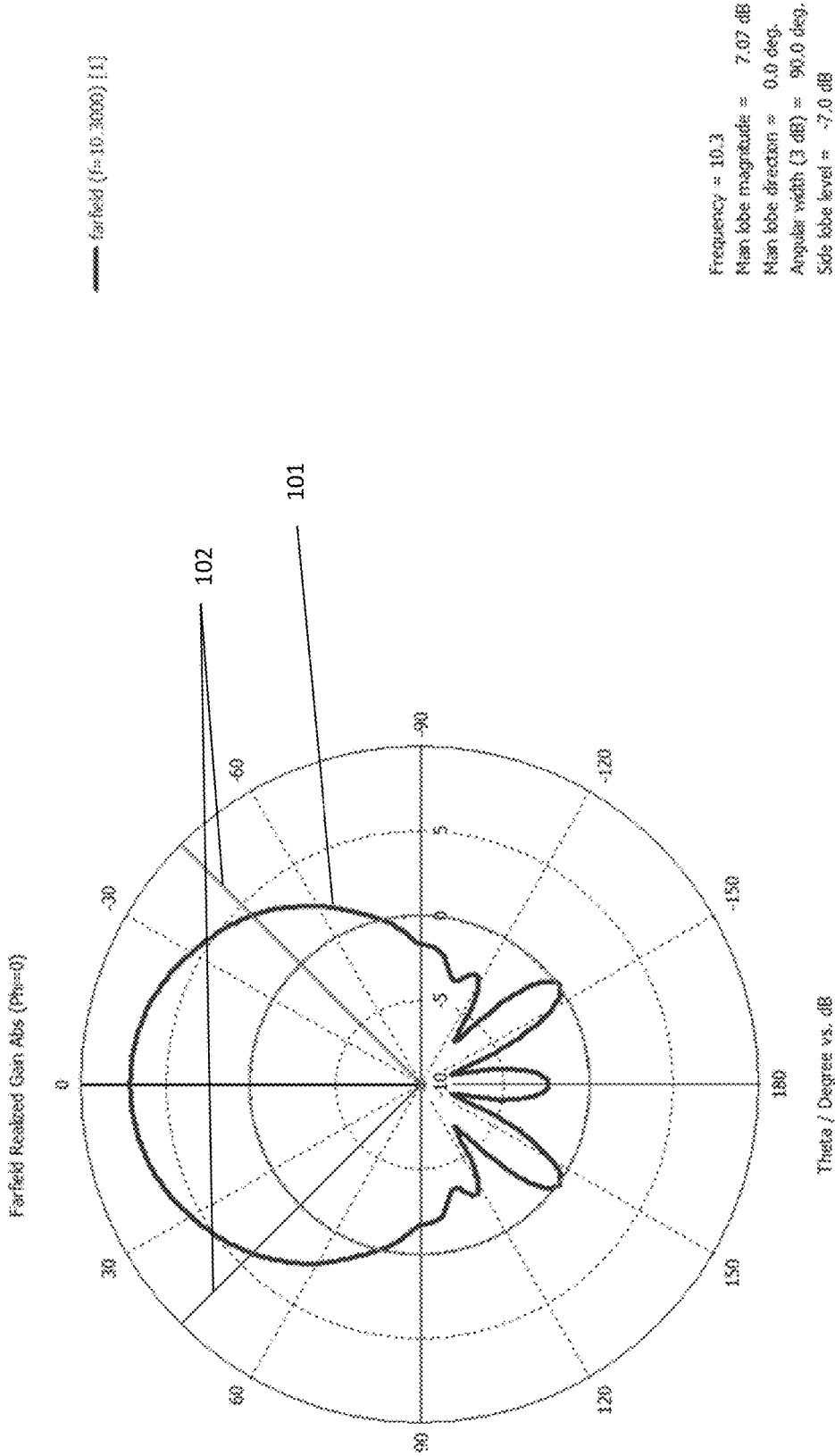
FIG. 10 shows a graphical example of receivers with a wide-angle radiation pattern 101 in polar coordinates, at a frequency of 10 GHz. The main lobe is 90 degrees at 3 dB beamwidth 102.
Figure 11:
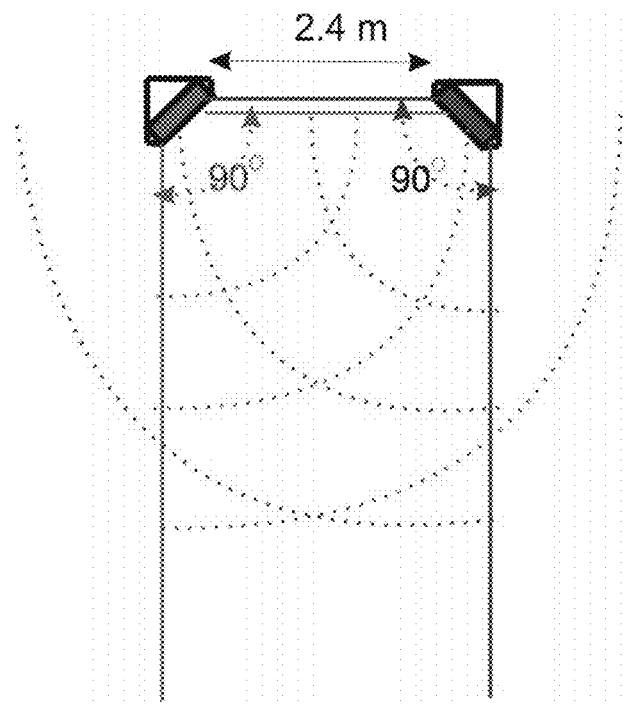
FIG. 11 shows an example illustration of a wide angle of inspection greater than 90 degrees of an inspected area (transmitters and receivers are located on each of the left and right pillars).
Figure 12:
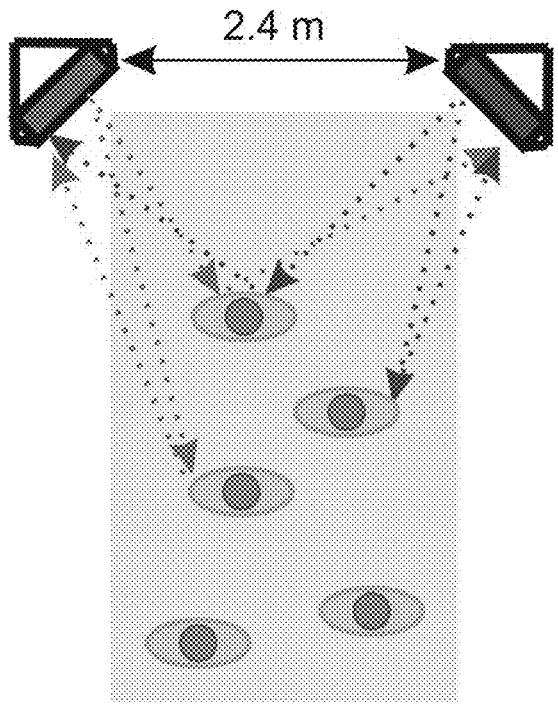
FIG. 12 shows an example illustration of a wide zone of inspection and operating pillars as a single system and as a complex system. A single system according to the present invention comprises means for transmitting and receiving wherein both means are located on one pillar or block. A complex system according to the present invention comprise means for transmitting and receiving wherein the transmitting means and receiving means are located on two or more separate pillars which may further correspond with each other.

Wide Zone of Inspection. The present invention achieves a wide zone of inspection. The wide zone of inspection is achieved by the following features: (1) a wide distance between pillars comprising microwave emitters/receivers (e.g., 2.4 meters between pillars); (2) each pillar is capable of operating as a single system (i.e., transmitters and receivers in one pillar) and also in combination as a complex system of pillars (i.e., at least two pillars, each with transmitters and/or receivers which may correspond with one another); and (3) inspection of targets from varying angles due to the geometry/setup of the pillars and cameras. See FIG. 12. FIGS. 9 and 10 further show Tx and Rx antennas which each individually have a greater than 90-degree lobe. FIG. 11 then shows an exemplary wide angle of inspection in a chosen geometry of pillars and FIG. 12 shows a wide zone of inspection, defined by Tx and Rx antennas having wide angles, a wide distance between pillars (e.g., 2.4 meters), and a capability of Tx and Rx antennas being located on the same pillar(s) (i.e., a simple, or independent, system) or a capability of Tx antennas being located on one pillar (e.g., left) and Rx antennas being located on another pillar (e.g., right), or vise-versa (i.e., a complex system). Such a setup allows for an inspection of targets from varying angles at the same time. Furthermore, other geometries are possible with 4 (or more) pillars. Two portals each may then be separated at 3 meters apart and facing each other (i.e., "Quadro" geometry), or two portals may be positioned back to back and facing opposite directions. These geometries and others are described in U.S. Pat. No. 9,282,258, which is referenced herein in its entirety.

Digital Focusing. The present invention is capable of achieving a digital focusing, rather than a mechanical scanning of the target area and subject(s). The digital focusing is achieved via coherent processing of the signals received (i.e., including both phase and magnitude/amplitude data simultaneously). In the prior art, such digital focusing is impossible or at least limited by computing resources for moving targets in wide inspection zones. For example, current prior art system data scans take a period of tens of milliseconds, but the data processing and analysis of the same scan takes a period of at least a few seconds. The present invention, however, is capable of performing both the scanning and the processing in real time (i.e., total scanning and processing occurs preferably in less than 50 milliseconds, or 50-60 milliseconds, depending of numbers of targets simultaneously investigated in the inspection zone. Scanning and processing occurs in parallel processors (i.e., the scanning and processing occurs simultaneously).

The digital focusing and real time processing discussed above allow for a high throughput without impeding the flow of targets through the inspection area, a feature which is required in mass transit hubs. The real-time operation is a result of, and includes without limitation, the following features: (1) fast switching of a frequency inside of a specially designed wideband frequency generator (a typical time for such fast switching, alongside a good frequency stability, is in the range of a few, e.g., 4-6, microseconds) 131; (2) fast switching of individual antennas within an array by specially designed multilayer electronic boards coupled with (i.e., comprising) multiple output fast keys (a typical time for such fast switching is in the range of tens of nanoseconds, e.g., 50-100 nanoseconds). It is further noted that the fast keys are switched based on an input signal to one of a set of outputs by command (e.g., four outputs). Four such keys are designed in a multiplexer (i.e., one input to one of 16 outputs by command). Each fast key (e.g., single microchip) thus has one input and four outputs. The boards for one antenna array may thus be 256 individual transmitters, which contains 64 fast keys to deliver one base signal, in each frequency, to the individual transmitters in real time; (3) an algorithm designed to process the signals received as a result of the fast switching described above, the algorithm being programmed on a microchip located on an electronic board and controlled by main processor located within the pillars according to the present invention. See FIG. 13.

Figure 13:
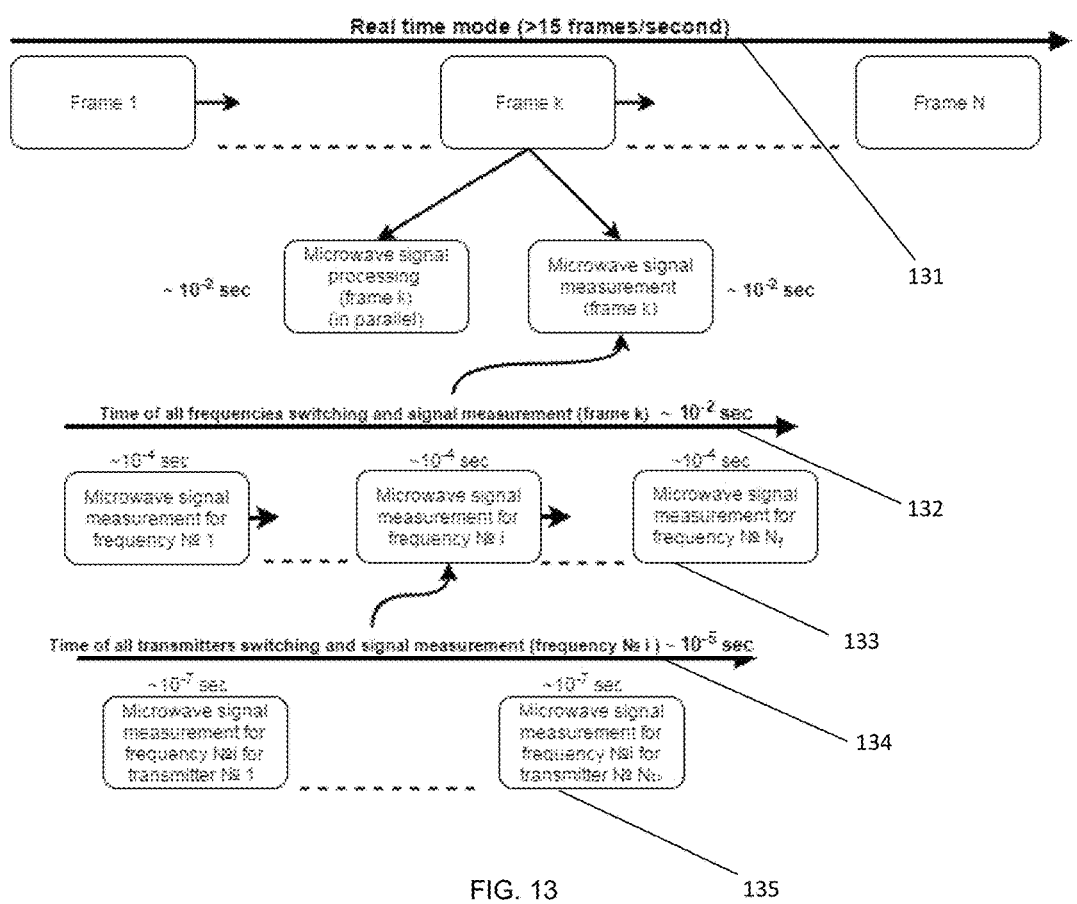
FIG. 13 shows an example flowchart illustration of the real-time processing (greater than 15 frames per second) of signals received and the fast switching, according to the present invention.

Discussing FIG. 13 further: One frame of processing may be broken down as shown in the figure. Moving from the bottom of FIG. 13 upwards, 135 represents the order of time necessary to measure a reflected signal from one transmitter (Tx) at one frequency (this occurs on the order of $10^{-7}$ seconds), for example, 800 nanoseconds; 134 represents the total time of all transmitter switching and signal measurements of all transmitters at one frequency (this occurs on the order of $10^{-5}$ seconds, as several microwave signals are measured); 133 represents the order of time necessary to measure reflected signals from all transmitters at one frequency (this occurs on the order of $10^{-4}$ seconds); 132 represents the total time for all transmitter switching at all frequencies combined and signal measurements of all transmitters at all frequencies combined (this occurs on the order of $10^{-2}$ seconds); 131 represents the number of frames per second (e.g., 15 fps) produced via a microwave signal measurement in one frame and within time period of about 50-60 milliseconds.

Real-time processing of signals received. An important parameter for determining the quality and efficiency of multi-threat detection is the time in which it takes to collect one frame of data. A typical time for collecting one frame is about tens of milliseconds, which includes all targets in a wide zone with fast frequency switching (typically more than hundred frequencies) and with fast switching of individual antennas in the array (typically, more than one thousand individual transmitters/receivers in up to four antenna arrays). The present invention is capable of capturing 15 or more frames per second of all detected targets within the inspection zone simultaneously (i.e. one frame is collected in about 50 milliseconds, processing of the same frame takes also about 50 milliseconds in parallel to the collection time; therefore, the two values determine a value of 15 frames per second, or more if one of the two values is further shortened). To put this value of 15 frames or more per second into perspective, the following examples are provided:

EXAMPLE 1

With a speed of 15 frames per second (fps), and a person moving approximately 10 cm per frame, the system of the present invention captures targets without losing processed information before the subject moves too far. If the speed decreases by 5 fps, the system would lose a tracked target because that target will have shifted 30 cm and may already cross into a neighboring trajectory channel of waves. Thus, a higher fps allows for such real-time processing while also providing the capability of processing several targets at once. In general, the more frames per second, the greater the performance and probability of detection, since all frames are used in the analysis independently and in combination contribute to any final alarm decision.

Current prior art in the field of invention is limited by data processing time (typical time is a few seconds). In the case of screening one target at a time (e.g., through a doorway/portal), or in the case of screening moving subjects, or in the case of screening non-moving targets while processing the data, the prior art comprises technology having a maximum of 15 fps. The present invention, however, is capable of operation at greater than 15 fps and applies to both moving and non-moving targets, at a rate of 15 fps or more, wherein the collection/capturing of data may occur in parallel with the processing of the same data.

Standoff detection at longer distances. The present invention is capable of inspecting an area as long and wide as 3 meters (or less), and/or an area as long as 6 meters (or less). The size of a given embodiment and inspection area may depend on specific factors such as, but not limited to, visibility zone of video, visibility zone of microwave imaging, and system resolution requirements.

Figure 14A:
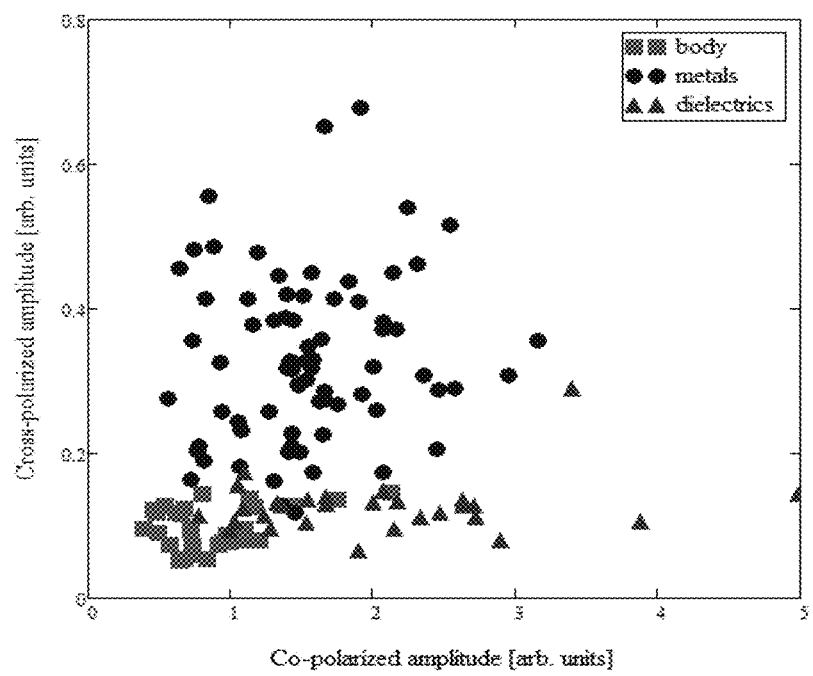
FIGS. 14A-14B.
Figure 14B:
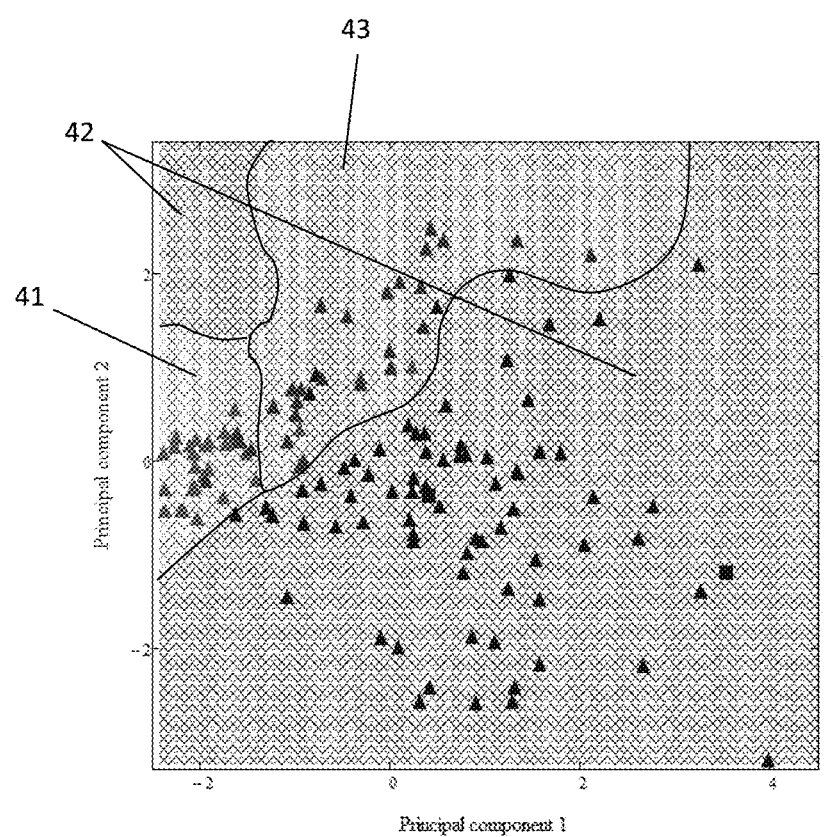

Multi-threat detection of explosives and metallic weapons simultaneously. Multi-threat detection of both explosives and metallic weapons, at the same time, and in real time, is achieved by the following aspects of the present invention: (1) each transmitter uses the same source of microwave irradiation; (2) various scattered polarization is detected by the same receiving antenna but turned 90 degrees (i.e., the same design receiving antenna turned 90 degrees about its axis of symmetry, such that the antenna receives cross-polarizations of transmitted signals); (3) a receiving antenna placed at 0 degrees, in relation to (2), for collecting initial polarization of transmitted and scattered signals (i.e., for receiving co-polarizations); (4) A calculated ratio of co-polarizations and cross-polarizations (collected preferably as described herein, i.e., antennas placed at "0" and "90" degrees) allows for detection of separate explosives threats and metallic object threats (see, e.g., FIGS. 14A-14B); and (5) a unique algorithm for separately reconstructing two 3D microwave images, one with regard to co-polarizations and the other with regard to cross-polarizations, for the detection and the separation of multiple threats potentially located on multiple targets simultaneously and in real time (i.e., signal measurement in parallel with processing of signals measured), which occurs via a final determination made by the system after combining information from each 3D microwave image, also in combination with any video Images Obtained.

High probability of detection coupled with a low false alarm rate. The ability of the present invention to process data in real time, and to collect and analyze all frames during a subject's movement within the zone of inspection, allow for a high probability of detection. The ability of the present system to combine information from two receiving blocks (e.g., explosives and metal detection) increases the performance of the processing and analysis of signals but also lowers the chances of a false alarm which would disturb the movement of all subjects within the inspection area.

The present invention generally describes apparatuses, including portals and detectors for detecting hazardous and/or radioactive materials, and methods for signal processing, decision making and/or for using the apparatuses. It should be understood that these apparatuses and methods are adapted to be used on a variety of subjects and in a variety of settings, including people, packages, conveyances, buildings, outdoor settings, and/or indoor settings. Also, within the scope of the invention is firmware, hardware, software and computer readable-media including software which is used for carrying out and/or guiding the methodologies described herein, particularly with respect to radioactive (and nuclear) threat detection. Hardware optionally includes a computer, the computer optionally comprising a processor, memory, storage space and software loaded thereon. The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. When used in the following claims, the terms "comprises", "includes", "have" and their conjugates mean "including but not limited to". The scope of the invention is limited only by the following claims.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A security checkpoint, comprising:
   at least one first block for detecting a first threat, the first threat comprising an explosive,
   at least one second block for detecting a second threat, the second threat comprising a metal,
   a processing unit, said processing unit performing a scanning of data from all blocks, said processing unit further determining a presence of a threat comprising an explosive or a metal weapon, said determining occurring on a frame-by-frame basis,
   an alarm, said alarm starting in case of a suspected threat presence, the alarm differentiating a type of the threat, the type of the threat being said first threat, said second threat, or a combination thereof,
   wherein the first block performs a measurement of a phase delay of a radiation and an amplitude of a radiation;
   wherein the radiation is irradiated by one or more transmitters,
   wherein the radiation is received by one or more receivers, wherein the phase delay and any amplitude changes are caused by two or more of: (1) the radiation being reflected by a garment, (2) the radiation travelling through the garment and being reflected by a human body, and (3) the radiation passing through the garment and an unknown object and being reflected by the human body, and wherein said processing unit determines a presence of a threat comprising an explosive or a metal weapon by comparing cross-polarized vs. co-polarized amplitudes.

2. The security checkpoint of claim 1, wherein said processing unit further differentiates between a body without threats, a body with metals, and a body with dielectrics.

3. The security checkpoint of claim 1, further comprising simultaneous video imaging.

4. The security checkpoint of claim 1, wherein an angle of inspection is greater than 90 degrees.

5. The security checkpoint of claim 1, wherein a distance between blocks is at least 2.4 meters.

6. The security checkpoint of claim 1, wherein said scanning and said determining a presence of a threat comprising an explosive or a metal weapon occurs simultaneously in real-time.

7. The security checkpoint of claim 6, wherein said determining a presence of a threat comprising an explosive or a metal weapon occurs in 50 milliseconds to 2 seconds.

8. The security checkpoint of claim 6, wherein said determining a presence of a threat comprising an explosive or a metal weapon occurs within 50 milliseconds.

9. The security checkpoint of claim 1, further comprising a wideband frequency generator, said wideband frequency generator being configured to switch a frequency of an emitted radiation within 4-6 microseconds.

10. The security checkpoint of claim 9, further comprising a multilayer electronic board, said multilayer electronic board comprising multiple output fast keys, said multiple output fast keys having a switching time on an order of tens of nanoseconds.

11. The security checkpoint of claim 1, wherein 15 or more frames are captured and processed by said processing unit per second.

12. The security checkpoint of claim 11, wherein 15 or more frames are captured and processed by said processing unit per second for all subjects within an inspection area simultaneously.

13. The security checkpoint of claim 12, wherein said subjects comprise moving objects.

14. The security checkpoint of claim 1, wherein an inspection area is 3 meters long and 3 meters wide.

15. The security checkpoint of claim 1, wherein an inspection area is 6 meters long and 3 meters wide.

16. The security checkpoint of claim 1, wherein the first block is oriented at 90 degrees relative to the second block.

17. The security checkpoint of claim 1, comprising at least two pillars for receiving said radiation, a first pillar being turned about its axis of symmetry relative to a second pillar.

18. The security checkpoint of claim 1, wherein said processing unit further reconstructs two 3D microwave images, comprising a first 3D microwave image of co-polarizations and a second 3D microwave image of cross-polarizations.

19. The security checkpoint of claim 18, wherein said processing unit further correlates corresponding 3D video imaging information.

\* \* \* \* \*